United States Patent
Fu et al.

(10) Patent No.: US 9,590,842 B2
(45) Date of Patent: Mar. 7, 2017

(54) METHOD AND NODE FOR SERVICE TO OCCUPY PROTECTED RESOURCE IN SHARED PROTECTION

(71) Applicant: ZTE CORPORATION, Shenzhen, Guangdong Province (CN)

(72) Inventors: Sen Fu, Shenzhen (CN); Yuanyuan Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 174 days.

(21) Appl. No.: 14/405,282

(22) PCT Filed: Jun. 5, 2013

(86) PCT No.: PCT/CN2013/076812
§ 371 (c)(1),
(2) Date: Dec. 3, 2014

(87) PCT Pub. No.: WO2013/182057
PCT Pub. Date: Dec. 12, 2013

(65) Prior Publication Data
US 2015/0131433 A1 May 14, 2015

(30) Foreign Application Priority Data

Jun. 5, 2012 (CN) .......................... 2012 1 0182958

(51) Int. Cl.
*H04L 12/24* (2006.01)
*H04L 12/911* (2013.01)
(Continued)

(52) U.S. Cl.
CPC .......... *H04L 41/0663* (2013.01); *H04L 45/22* (2013.01); *H04L 45/28* (2013.01); *H04L 47/70* (2013.01)

(58) Field of Classification Search
None
See application file for complete search history.

(56) References Cited

U.S. PATENT DOCUMENTS 6,256,292 B1 * 7/2001 Ellis ........................ H04J 3/085
370/227
8,218,434 B1 * 7/2012 Brown .................... H04L 45/22
370/227
(Continued)

FOREIGN PATENT DOCUMENTS

CN 101969382 A 2/2011
CN 102739441 A 10/2012
(Continued)

*Primary Examiner* — Andrew Oh
(74) *Attorney, Agent, or Firm* — Ling Wu; Stephen Yang; Ling and Yang Intellectual Property (57) ABSTRACT

Disclosed are a method and node for a service to occupy protection resources in shared protection, including: when receiving a command or service state information, a node responding to the command or service state and allocating protection resources to a corresponding service in accordance with a priority order of a first-level manual command, a service signal failure, a service signal degradation and a second-level manual command. By integrating priorities of the manual command and the service state, the embodiments of the present document formulate a set of unified priority rules, reducing the information stored on nodes in a mesh network, and simplifying the processing procedure of the mesh network.

10 Claims, 3 Drawing Sheets

(51) Int. Cl.
*H04L 12/703* (2013.01)
*H04L 12/707* (2013.01)

(56) References Cited

U.S. PATENT DOCUMENTS

| | | | | |
|---|---|---|---|---|
| 2002/0080724 | A1* | 6/2002 | Nham | H04L 12/5601 |
| | | | | 370/250 |
| 2002/0191244 | A1* | 12/2002 | Antosik | H04B 10/07 |
| | | | | 398/1 |
| 2004/0179472 | A1* | 9/2004 | Khalilzadeh | H04J 14/0283 |
| | | | | 370/227 |
| 2005/0058064 | A1* | 3/2005 | Phelps | H04L 41/0893 |
| | | | | 370/225 |
| 2005/0088963 | A1* | 4/2005 | Phelps | H04J 3/14 |
| | | | | 370/216 |
| 2005/0099941 | A1 | 5/2005 | Sestito et al. | |
| 2007/0211742 | A1* | 9/2007 | Trisno | H04J 14/0287 |
| | | | | 370/419 |
| 2012/0082026 | A1* | 4/2012 | Ryoo | H04L 45/28 |
| | | | | 370/220 |
| 2012/0294140 | A1* | 11/2012 | Cheung | H04L 45/24 |
| | | | | 370/216 |

FOREIGN PATENT DOCUMENTS

| | | | |
|---|---|---|---|
| WO | 2010060203 | A1 | 6/2010 |
| WO | 2012037812 | A1 | 3/2012 |

\* cited by examiner

METHOD AND NODE FOR SERVICE TO OCCUPY PROTECTED RESOURCE IN SHARED PROTECTION

TECHNICAL FIELD

The present document relates to the field of mesh network technology, and more particularly, to a method and node for a service to occupy protection resources in shared protection.

BACKGROUND

The data transport network is currently developing toward the direction of more and more nodes and more and more complex topology, the mesh network has become the ultimate goal of the development of optical transport network (OTN), packet transmission network (PTN), Synchronous Digital Hierarchy (SDH) network, and so on. In a mesh network, currently linear protection such as 1+1 and 1:1 as well as ring shared protection can be deployed; but these methods are unable to make full use of the reserved bandwidth resource of the mesh network, resulting in low overall network utilization.

Intra-network shared protection is a new universal protection method, its most important feature is to achieve that the protected services share the protection resources in the mesh network, thereby enhancing the overall network utilization. Since a plurality of protected services share the same segment of protection resources, when a plurality of protected services need to use the protection resources, there emerges competition for the resources, and preemption is one of the simplest mechanisms to solve the competition. Usually, people set service levels for the protected services to serve as a basis of judgment on preemption.

In the field of protection technology, there is also the priority principle between the manual command and the link state. Usually there are several levels of manual commands, for example, there are force switching command and manual switching command in the linear protection, wherein the force switching command has a higher priority than the link failure, while the manual switching command has a lower priority than the link failure.

Due to the existences of service levels and manual command priorities, it needs to judge these two dimensions in the shared protection in the mesh network, moreover, it needs to determine which dimension is taken as the reference, for example, for a high-level command for a service with low priority and a low-level command for a service with high priority, it is difficult to determine which one takes precedence, thereby resulting in the need to develop a set of very complex rules in order to meet the requirements.

SUMMARY

The embodiment of the present document provides a method and node for a service to occupy protection resources in a shared protection, so as to determine the service occupying the protection resources without the use of complex rules.

A method for a service to occupy protection resources in a shared protection in accordance with an embodiment of the present document, comprising:

when receiving a command or service state information, a node responding the command or the service state and allocating protection resources to an appropriate service according to a priority order of a first-level manual command, service signal failure, service signal degradation, and second-level manual command.

Preferably, the abovementioned method further comprises:

the node determining priorities of signal failure and signal degradation of different services according to the service levels.

Preferably, the first-level manual command comprises lock command and force switching command, and the lock command comprises from highest to lowest priority: protection resource lock, protection cross-segment lock and signal lock, the force switching command comprises from highest to lowest priority: force switching to working command and force switching to protection command, the second-level manual command comprises from highest to lowest priority: manual switching command, exercise command, response, no reply returned, and no request.

Preferably, the abovementioned method further comprises:

when receiving signal failure state information for the protection resources, the node responding to the state in accordance with the priority of the signal failure of the protection resources being lower than the protection cross-segment lock but higher than the signal lock; when waiting for restoration, responding in accordance with the priority of waiting for restoration being lower than the manual switching command but higher than the exercise command.

Preferably, the abovementioned method further comprises:

after allocating the protection resources to the appropriate service, the node still maintaining the working service state, a trigger condition for the working service switching from the failure state→failure state is that some or all of the protection resources of the working service are locked or fail; the trigger condition of failure state→switching state is that part or all of the protection resources lock is cleared, the failure disappears or the protection resources are released by services with higher priorities; the trigger condition of switching state→failure state is that all the protection resources are locked, fail or are occupied by services with higher priorities; the trigger condition of switching state→switching state is that some of the protection resources are locked, fail or are occupied by services with higher priorities.

Preferably, the abovementioned method further comprises:

the trigger condition for the working service switching from switching state→idle state is that the working signal failure disappears, the force switching is cleared, the manual switching is cleared or the signal is locked; the trigger condition of idle state→switching state is the working signal failure, force switching or manual switching.

Preferably, the abovementioned method further comprises:

the trigger condition of the working service switching from idle state→idle state is that the signal is locked or the signal lock is cleared; the trigger condition of idle state→idle state—protection unavailable is that all the protection resources are locked, fail or are occupied by services with higher priorities; the trigger condition of idle state—protection unavailable→idle state is that part or all of the protection resources lock is cleared, the failure disappears or the protection resources are released by the services with higher priorities; the trigger condition of idle state—protection unavailable→idle state—protection unavailable is that some or all of the protection resources are locked or fail; the trigger condition of idle state—protection unavailable→failure state is the working signal failure; the trigger condition of failure state→idle state—protection unavailable is that the working signal failure disappears.

The embodiment of the present document provides a node, comprising: a receiving unit and a protection resource allocating unit, wherein:

the receiving unit is configured to receive a command or service state information;

the protection resource allocating unit is configured to, after the receiving unit receives the command or service state information, respond to the signaling or state and allocate protection resources to the appropriate service according to a priority order of a first-level manual command, service signal failure, service signal degradation, and second-level manual command.

Preferably, the protection resource allocating unit is further configured to, for signal failure and signal degradation of services, determine priorities of signal failure and signal degradation of different services according to the service levels.

Preferably, the first-level manual command comprises lock command and force switching command, and the lock command comprises from highest to lowest priority, protection resource lock, protection cross-segment lock and signal lock, the force switching command comprises from highest to lowest priority, force switching to working command and force switching to protection command, the second-level manual command comprises from highest to lowest priority, manual switch command, exercise command, response, no reply returned, and no request;

the protection resource allocating unit is further configured to, when receiving the signal failure state information of the protection resources, respond to the state in accordance with the priority of signal failure of the protection resources being lower than the protection cross-segment lock while higher than the signal lock; when waiting for restoration, respond in accordance with the priority of the waiting for restoration being lower than the manual switching while higher than the exercise command.

Preferably, it further comprises a state maintaining unit, wherein:

the state maintaining unit is configured to maintain the working service state after the protection resource allocating unit allocates the protection resources to the appropriate service, and the trigger condition of the working service switching from failure state→failure state is that some or all of the protection resources are locked or fails; the trigger condition of failure state→switching state is that some or all of the protection resources lock is cleared, the failure disappears or the protection resources are released by services with higher priorities; the trigger condition of switching state→failure state is that all of the protection resources are locked, fail or are occupied by service with higher priorities; the trigger condition of switching state→switching state is that some of the protection resources are locked, fail or are occupied by services with higher priorities; the trigger condition of switching state→idle state is that the working signal failure disappears, the force switching is cleared, the manual switching is cleared or the signal is locked; the trigger condition of idle state→switching state is the working signal failure, force switching or manual switching.

In summary, the embodiments of the present document integrate the priorities of the manual command and the service state and develop a set of unified priority rules, reducing the information stored on the nodes in the mesh network and simplifying the processing procedure of the mesh network.

PREFERRED EMBODIMENTS OF THE DOCUMENT

Hereinafter in conjunction with the accompanying drawings, the embodiments of the present document will be described in detail. It should be noted that, in the case of no conflict, the embodiments and features in the embodiments of the present application may be arbitrarily combined with each other.

In this embodiment, the service level classification in shared protection domain in the mesh network is defined, the signal failure and signal degradation occurred in a service are expanded in accordance with the service level, the priorities of signal failure and signal degradation of different services are determined in accordance with the service levels, the signal failure of high-level service is indicated as signal failure—high level; the signal failure of low-level service is indicated as signal failure—low level; the manual command is divided into a plurality of categories (such as two categories), first-level (high-level) manual command, when this class of commands is performed, the signal failure and signal degradation are suppressed; the second-level (low-level) manual command, when a signal failure or signal degradation occurs, these commands will be suppressed; therefore, the mesh network shared protection protocol processing will comply with the following principles:

(1) high-level manual command suppresses all levels of signal failure, when processing a high-level manual command, do not respond to any level of signal failure, signal degradation, or low-level manual command;

(2) signal failure—high level will suppress signal failure—low level, when a signal failure—high level occurs, do not respond to the signal failure—low level or any level of signal degradation, or the low-level manual command;

(3) signal failure will suppress signal degradation, when there is any level of signal failure, do not respond to any level of signal degradation, or the low-level manual command;

(4) signal degradation—high level will suppress signal degradation—low level, when a signal degradation—high level occurs, do not respond to the signal degradation—low level or the low-level manual command;

(5) signal degradation will suppress the low-level manual command, when there is any level of signal degradation, do not respond to the low-level manual command.

In the following, in conjunction with specific network examples, the specific implementation process of the present embodiment will be described.

Take the optical transport network (OTN) for example, five service levels from high to low in the order of 1 to 5 are defined in the shared protection domain in the mesh network; the manual commands of shared protection in the mesh network are defined as follows, wherein, the lock command and force switching command belong to the first-level manual command, the manual switching, exercise command, response, no reply returned and no request belong to the second-level manual command, the lock command comprises protection resource lock, protection cross-segment lock and signal lock, the force switching command comprises from high to low priority, force switching to working command and force switching to protection command, and in the following the commands are described briefly:

protection resources lock: prevent all signals from occupying the protection resources;

protection cross-segment locked: prevent all signals from occupying the cross-segment resources;

force switching of signal: force the signal switching to its protection resource;

manual switching of signal: switch the signal to the protection resource only if any signal but the local one of the protected services of the protection resources and the protection resources themselves do not have failure;

signal lock: prevent the signal from occupying the protection resources;

exercise: used to test whether the APS (Automatic Protection protocol signal) communication is normal or not, and having a lower priority than the actual switch request;

TABLE 1

| Request/State | Priority |
|---|---|
| Protection resource lock | 1 (highest) |
| Protection cross-segment lock | 2 |
| Signal failure - Protection resource | 3 |
| Signal lock | 4 |
| Force switching | 5 |
| Signal failure - Service level 1 | 6 |
| Signal failure - Service level 2 | 7 |
| Signal failure - Service level 3 | 8 |
| Signal failure - Service level 4 | 9 |
| Signal failure - Service level 5 | 10 |
| Signal degradation - Service level 1 | 11 |
| Signal degradation - Service level 2 | 12 |
| Signal degradation - Service level 3 | 13 |
| Signal degradation - Service level 4 | 14 |
| Signal degradation - Service level 5 | 15 |
| Manual switching | 16 |
| Wait for restoration | 17 |
| Exercise | 18 |
| Response | 19 |
| No reply returned | 20 |
| No request | 21 (lowest) |

In the OTN network, a upstream node occupies the first 5 bits in the APS/PCC overhead of the ODUk to instruct a downstream node the command or status of a request, as shown in Table 2, the local command or state is filled in the PCC and sent to the downstream node, and the downstream node analyzes information in the PCC based on the detected PCC change, to obtain the command or state of the peer-end node.

TABLE 2

| 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| Command/state | | | | | | | | Protection architecture | | | | | | | | Protection entity identification | | | | | | | | Reserved | | | | | | | | the clear command is a command used to clear the manual command, the priority of the clear command is higher than all the manual commands, but it does not have a priority relationship with the signal failure and signal degradation.

The shared protection in the mesh network comprises the following automatic switching mechanism:

signal failure: comprising the failure of the protected services, as well as the failure of the protection resources;

signal degradation: only comprising the degradation of the protected services, after the protection resources degrade, an APS protocol alarm may be generated, therefore it cannot work as an automatic switching mechanism.

wait for restoration: WTR (wait for the return) means that, after the original path of the protected service returns to normal, wait for some time and then return to the original path, in order to avoid the service from jittering with the link before the original path becomes stable.

The protection protocol priority rules are define as shown in Table 1:

After receiving the command or service state information, the node responds to the command or state in accordance with the above priority rules and allocates the protection resources to the respective service.

Figure 1:
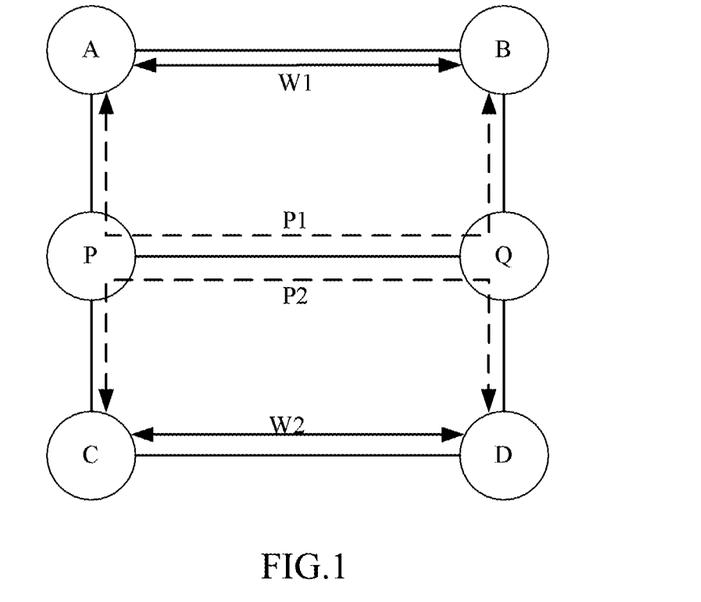
FIG. 1 is a topology of a shared mesh network in the related art.

FIG. 1 shows a typical topology of a shared mesh network. In FIG. 1, the protection path of the service W1 is P1, the protection path of the service W2 is P2, and P1 and P2 share the cross-segment PQ, the service level of the service W1 is 3, and the service level of the service W2 is 1.

The First Embodiment

Figure 2:
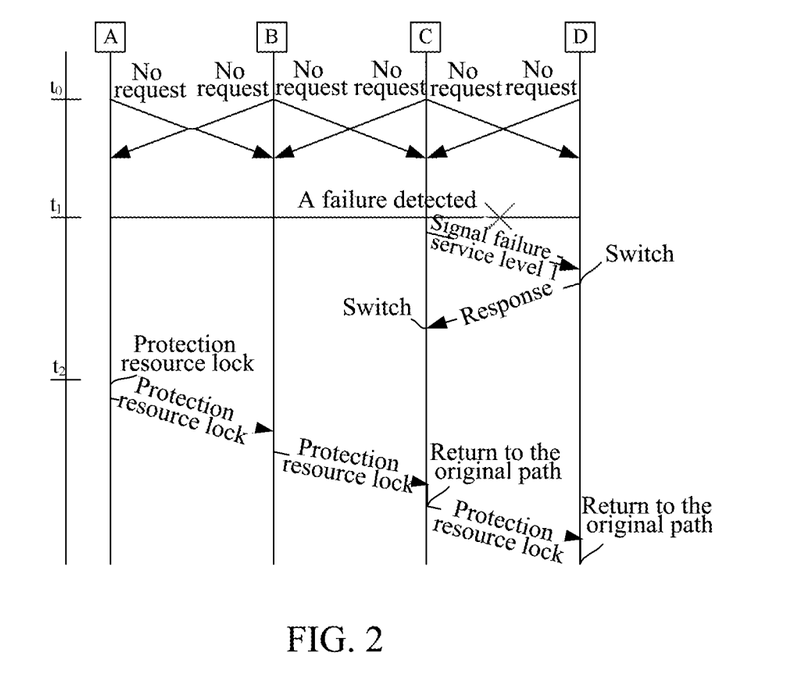
FIG. 2 is a schematic diagram of priority handling when the automatic switching condition and the manual command occur simultaneously in accordance with the present embodiment.

FIG. 2 shows a priority processing procedure when the automatic switching condition and the manual command occur simultaneously, comprising:

At time point t1, the node C detects a failure, sends the state information of "Signal Failure— Service level 1" to the node D, the node D performs a switching and responds; the node C performs a switching after receiving the response.

At time point t2, the node A manually sends a protection resource lock command, the node A sends a protection resource lock command to the nodes B, C and D; after the nodes C and D receive the command, the service returns back to the original path.

The Second Embodiment

Figure 3:
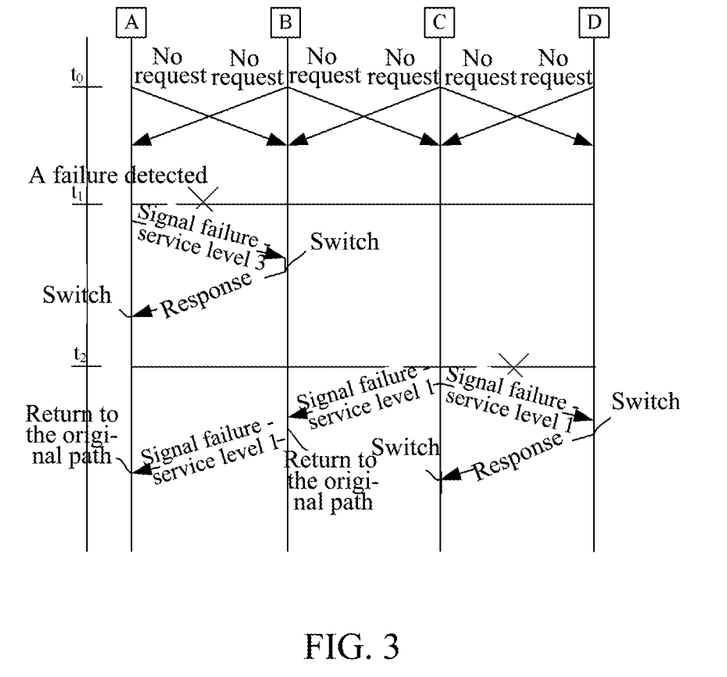
FIG. 3 is a schematic diagram of priority handling when different levels of services trigger the automatic switching condition in accordance with the present embodiment.

FIG. 3 shows a priority processing procedure when different levels of services trigger the automatic switching condition, comprising:

At time point t1, the node A detects a failure, and sends a "Signal failure—Service level 3", the node B performs a switching after receiving the command and responds; the node A performs a switching after receiving the response;

At time point t2, the node C detects a failure, and sends a "Signal failure—Service level 1" to preempt the switch between the nodes A and B, after the nodes A and B receive the state information, perform a return, the local service switching is preempted, and the node D executes a switching.

Combining with the shared protection protocol processing principles in the mesh network in the present embodiment, the state switching of the following working service can be obtained, and the node performs the appropriate action according to different states. Herein a mesh network with the M:N structure is described, each working service in the mesh network with the M:N structure has a plurality of protection resources, the levels of the protection resources can be specified by the user, or can be determined in accordance with the total number of times of each cross-segment of the protection resources being shared, the path length, and other factors. When a certain protection resource is unavailable (occupied by a high-level service, or the protection resource fails, or the protection is locked), the service can select other available protection resources to perform the switching.

Figure 4:
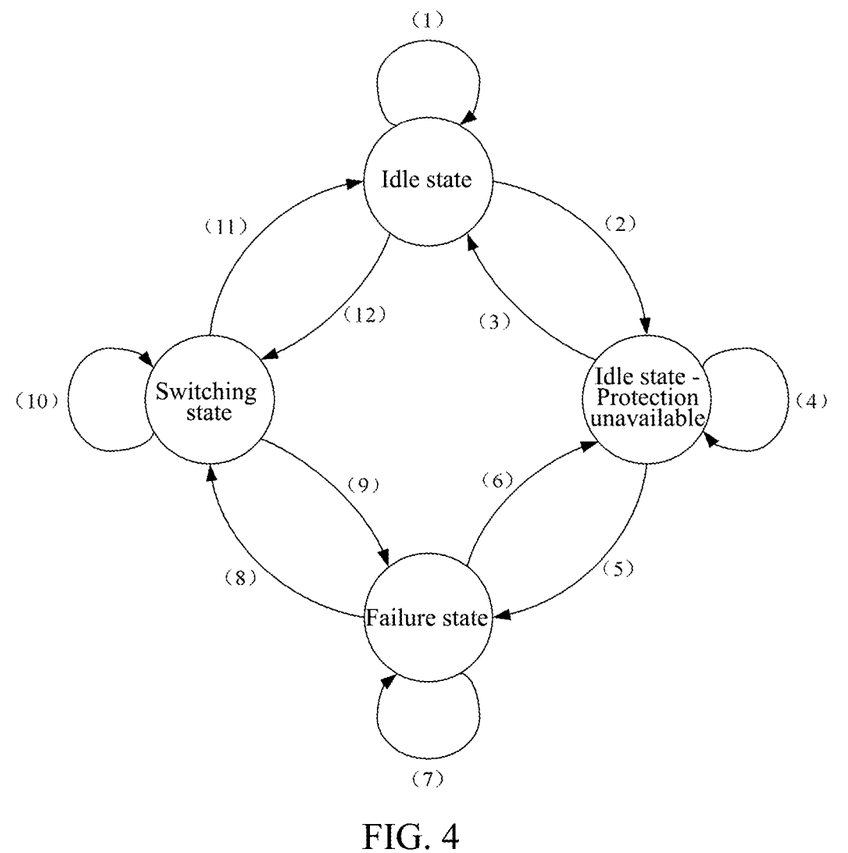
FIG. 4 is a schematic diagram of working service status switching in a mesh network in accordance with the present embodiment.

FIG. 4 shows a switching between the states of a working service, and the trigger conditions of the switching are described as follows:

(1) the trigger condition of idle state→idle state is that the signal is locked or the signal lock is cleared;

(2) the trigger condition of idle state→idle state—protection unavailable is that all the protection resources of the working service are locked, fail or are occupied by services with higher priorities;

(3) the trigger condition of idle state—protection unavailable→idle state is that some or all of the protection resources lock of the working service is cleared, the failure disappears or the protection resources are released by the other services with higher priorities;

(4) the trigger condition of idle state—protection unavailable→idle state—protection unavailable is that some or all of the protection resources are locked or fail;

(5) the trigger condition of idle state—protection unavailable→failure state is the working signal failure;

(6) the trigger condition of failure state→idle state—protection unavailable is that the working signal failure disappears;

(7) the trigger condition of failure state→failure state is that some or all of the protection resources are locked or fail;

(8) the trigger condition of failure state→switching state is that some or all of the protection resources lock of the working service is cleared, the failure disappears or the protection resources are released by the services with higher priorities;

(9) the trigger condition of switching state→failure state is that all the protection resources of the working service are locked, fail or are occupied by services with higher priorities;

(10) the trigger condition of switching state→switching state is that some of the protection resources are locked, fail or are occupied by services with higher priorities;

(11) the trigger condition of switching state→idle state is that the working signal failure disappears or the force switching is cleared, the manual switching is cleared or the signal is locked;

(12) the trigger condition of idle state→switching state is the working signal failure, force switching or manual switching.

Figure 5:
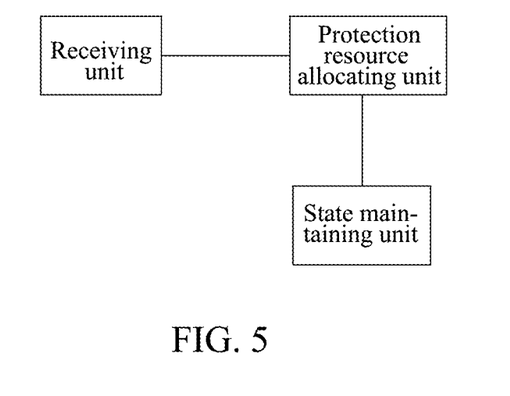
FIG. 5 is an architectural diagram of a node in accordance with the present embodiment.

As shown in FIG. 5, the present embodiments further provide a node, comprising: a receiving unit and a protection resource allocating unit, wherein:

the receiving unit is configured to receive a command or service state information;

the protection resource allocating unit is configured to, after the receiving unit receives the command or service state information, respond to the signaling or state and allocate protection resources to the appropriate service according to a priority order of first-level manual command, service signal failure, service signal degradation, and second-level manual command.

The protection resource allocating unit is further configured to, for signal failure and signal degradation of services, determine priorities of signal failure and signal degradation of different services according to the service levels.

The first-level manual command comprises lock command and force switching command, and the lock command comprises from highest to lowest priority, protection resource lock, protection cross-segment lock and signal lock, the force switching command comprises from highest to lowest priority, force switching to working command and force switching to protection command, and the second-level manual command comprises from highest to lowest priority, manual switching command, exercise command, response, no reply returned, and no request.

The protection resource allocating unit is further configured to, when receiving the signal failure state information of the protection resources, respond to the state in accordance with the priority of signal failure of the protection resource being lower than the protection cross-segment lock while higher than the signal lock; when waiting for restoration, respond in accordance with the priority of the waiting for restoration being lower than the manual switching while higher than the exercise command.

The node further comprises a state maintaining unit, which is configured to maintain the working service state after the protection resource allocating unit allocates the protection resources to the appropriate service, and the trigger condition of the working service switching from failure state→failure state is that some or all of the protection resources are locked or fail; the trigger condition of failure state→switching state is that some or all of the protection resources lock is cleared, the failure disappears or the protection resources are released by services with higher priorities; the trigger condition of switching state→failure state is that all of the protection resources are locked, fail or are occupied by services with higher priorities; the trigger condition of switching state→switching state is that some of the protection resources are locked, fail or are occupied by services with higher priorities; the trigger condition of switching state→idle state is that the working signal failure disappears, the force switching is cleared, the manual switching is cleared or the signal is locked; the trigger condition of idle state→switching state is the working signal failure, forced switching or manual switching.

Obviously, those ordinarily skilled in the art can understand that the respective modules/steps in the abovementioned present document may be implemented with universal computing devices, they can be concentrated on a single computing device or distributed in a network composed of a plurality of computing devices, alternatively, they can be implemented with program codes executable by computing devices, therefore they can be stored in storage means and executed by computing devices, or they are made into respective integrated circuit modules, or some of them are made into a single integrated circuit module to implement. Thus, the present document is not limited to any specific combination of hardware and software.

The above description is only preferred embodiments of the present document and not intended to limit the present document. For a person skilled in the art, the present document can have various changes and modifications. Any changes, equivalents and improvements made within the spirit and principle of the present document should be included within the protection scope of the present document.

INDUSTRIAL APPLICABILITY

The embodiments of the present document integrate the priorities of the manual command and the service state, to develop a set of unified priority rules, reducing the information stored on the nodes in the mesh network and simplifying the processing procedure of the mesh network.

What is claimed is:

1. A method for a service to occupy protection resources in shared protection, comprising:
when receiving a command or service state information, a node responding the command or the service state and allocating protection resources to an appropriate service according to a priority order of a first-level manual command, service signal failure, service signal degradation, and second-level manual command;
wherein the first-level manual command comprises lock command and force switching command, and the lock command comprises from highest to lowest priority: protection resource lock, protection cross-segment lock and signal lock, the force switching command comprises from highest to lowest priority: force switching to working command and force switching to protection command, the second-level manual command comprises from highest to lowest priority: manual switching command, exercise command, response, no reply returned, and no request.

2. The method of claim 1, further comprising:
the node determining priorities of signal failure and signal degradation of different services according to service levels.

3. The method of claim 1, further comprising:
when receiving signal failure state information for the protection resources, the node responding to the state in accordance with the priority of the signal failure of the protection resources being lower than the protection cross-segment lock but higher than the signal lock; when waiting for restoration, responding in accordance with the priority of waiting for restoration being lower than the manual switching command but higher than the exercise command.

4. The method of claim 3, further comprising:
after allocating the protection resources to the appropriate service, the node still maintaining the working service state, wherein, a trigger condition for the working service switching from the failure state to failure state is that some or all of the protection resources of the working service are locked or fail; the trigger condition of failure state to switching state is that part or all of the protection resources lock is cleared, the failure disappears or the protection resources are released by services with higher priorities; the trigger condition of switching state to failure state is that all the protection resources are locked, fail or are occupied by services with higher priorities; the trigger condition of switching state to switching state is that some of the protection resources are locked, fail or are occupied by services with higher priorities.

5. The method of claim 4, further comprising:
the trigger condition for the working service switching from switching state to idle state is that a working signal failure disappears, the force switching is cleared, the manual switching is cleared or the signal is locked; the trigger condition of idle state to switching state is the working signal failure, force switching or manual switching.

6. The method of claim 5, further comprising:
the trigger condition of the working service switching from idle state to idle state is that the signal is locked or the signal lock is cleared; the trigger condition of idle state to idle state—protection unavailable is that all the protection resources are locked, fail or are occupied by services with higher priorities; the trigger condition of idle state—protection unavailable to idle state is that part or all of the protection resources lock is cleared, the failure disappears or the protection resources are released by the services with higher priorities; the trigger condition of idle state—protection unavailable to idle state—protection unavailable is that some or all of the protection resources are locked or fail; the trigger condition of idle state—protection unavailable to failure state is the working signal failure; the trigger condition of failure state to idle state—protection unavailable is that the working signal failure disappears.

7. A node, comprising a computing device, and a storage device for storing computer executable instructions that when executed by the computing device cause the computing device to perform functions in following units: a receiving unit and a protection resource allocating unit, wherein:
the receiving unit is configured to receive a command or service state information;
the protection resource allocating unit is configured to, after the receiving unit receives the command or service state information, respond to the signaling or state and allocate protection resources to the appropriate service according to a priority order of a first-level manual command, service signal failure, service signal degradation, and second-level manual command;
wherein the first-level manual command comprises lock command and force switching command, and the lock command comprises from highest to lowest priority: protection resource lock, protection cross-segment lock and signal lock, the force switching command comprises from highest to lowest priority: force switching to working command and force switching to protection command, the second-level manual command comprises from highest to lowest priority: manual switching command, exercise command, response, no reply returned, and no request.

8. The node of claim 7, wherein,
the protection resource allocating unit is further configured to, determine priorities of signal failure and signal degradation of different services according to the service levels.

9. The node of claim 8, wherein
the protection resource allocating unit is further configured to, when receiving the signal failure state information of the protection resources, respond to the state in accordance with the priority of signal failure of the protection resources being lower than the protection cross-segment lock while higher than the signal lock; when waiting for restoration, respond in accordance with the priority of the waiting for restoration being lower than the manual switching while higher than the exercise command.

10. The node of claim 9, the computer executable instructions further causes the computing device to perform functions in a state maintaining unit, wherein:
the state maintaining unit is configured to maintain the working service state after the protection resource allocating unit allocates the protection resources to the appropriate service, and the trigger condition of the working service switching from failure state to failure state is that some or all of the protection resources are locked or fails; the trigger condition of failure state to switching state is that some or all of the protection resources lock is cleared, the failure disappears or the protection resources are released by services with higher priorities; the trigger condition of switching state to failure state is that all of the protection resources are locked, fail or are occupied by service with higher priorities; the trigger condition of switching state to switching state is that some of the protection resources are locked, fail or are occupied by services with higher priorities; the trigger condition of switching state to idle state is that the working signal failure disappears, the force switching is cleared, the manual switching is cleared or the signal is locked; the trigger condition of idle state to switching state is the working signal failure, force switching or manual switching.

* * * * *